(12) United States Patent
Han

(10) Patent No.: US 12,280,837 B2
(45) Date of Patent: Apr. 22, 2025

(54) STEER-BY-WIRE TYPE STEERING DEVICE

(71) Applicant: HL MANDO CORPORATION, Pyeongtaek-si (KR)

(72) Inventor: HyunSik Han, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 631 days.

(21) Appl. No.: 17/500,698

(22) Filed: Oct. 13, 2021

(65) Prior Publication Data

US 2022/0111886 A1 Apr. 14, 2022

(30) Foreign Application Priority Data

Oct. 14, 2020 (KR) .................. 10-2020-0132365

(51) Int. Cl.
*B62D 5/04* (2006.01)

(52) U.S. Cl.
CPC .................. *B62D 5/0445* (2013.01)

(58) Field of Classification Search
CPC .................. B62D 5/0445; B62D 5/00
See application file for complete search history.

(56) References Cited

U.S. PATENT DOCUMENTS

| | | | |
|---|---|---|---|
| 8,540,258 B2* | 9/2013 | Bae | B62D 5/0448 384/582 |
| 8,789,648 B2* | 7/2014 | Lee | F16H 55/14 180/444 |
| 10,046,794 B2* | 8/2018 | Bae | B62D 7/226 |
| 11,364,947 B2* | 6/2022 | Ryu | F16C 19/06 |
| 11,661,100 B2* | 5/2023 | Jeon | B62D 5/0424 180/444 |
| 2017/0158221 A1 | 6/2017 | Yamamoto | |
| 2020/0094869 A1* | 3/2020 | Jeon | F16C 27/04 |
| 2021/0129897 A1* | 5/2021 | Ryu | F16C 19/06 |

FOREIGN PATENT DOCUMENTS

| | | |
|---|---|---|
| CN | 104097683 A | 10/2014 |
| CN | 104326015 A | 2/2015 |
| CN | 105074238 A | 11/2015 |
| CN | 105209318 A | 12/2015 |
| CN | 209535194 A | 10/2019 |
| JP | 2017-100672 A | 6/2017 |
| JP | 2018-8653 A | 1/2018 |
| KR | 10-2012-0055931 A | 6/2012 |
| KR | 10-2019-0047883 A | 5/2019 |

OTHER PUBLICATIONS

Office Action issued on Nov. 29, 2024 for corresponding Chinese Patent Application No. 202111193499.9, along with partial English translation (16 pages).
Office Action dated Jan. 21, 2025 for corresponding Korean Patent Application No. 10-2020-0132365, along with an English machine translation (6 pages).

* cited by examiner

*Primary Examiner* — Kevin Hurley
*Assistant Examiner* — Michael R Stabley
(74) *Attorney, Agent, or Firm* — Hauptman Ham, LLP

(57) ABSTRACT

According to the present embodiments, it is possible to reduce components, e.g., pinion and support yoke, save costs by simplifying the shape and assembly process, reduce operation and reverse steering noise due to inter-gear friction, and driving friction, and enhance durability.

10 Claims, 6 Drawing Sheets

STEER-BY-WIRE TYPE STEERING DEVICE

CROSS-REFERENCE TO RELATED APPLICATION

This application claims priority from Korean Patent Application No. 10-2020-0132365, filed on Oct. 14, 2020, which is hereby incorporated by reference for all purposes as if fully set forth herein.

BACKGROUND

Field

The present embodiments relate to a steer-by-wire type steering device, and more particularly, to a steer-by-wire type steering device for which it is possible to reduce components, e.g., pinion and support yoke, save costs by simplifying the shape and assembly process, reduce operation and reverse steering noise due to inter-gear friction, and driving friction, and enhance durability.

Description of Related Art

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

For compatibility with the production and assembly line of general steering devices, the conventional steer-by-wire steering device comes equipped with a pinion shaft that engages with the rack bar to prevent rotation, so that the rack bar slides only axially, and to sense the moving position of the rack bar.

However, as a pinion shaft is provided, the number of necessary components is increased, e.g., the need for providing a support yoke by forming a rack gear in the rack bar, and the assembly process may be complicated and inefficient. Further, frictional noise may result between the rack gear and the pinion gear or, upon reverse steering, banging noise may occur.

BRIEF SUMMARY

According to the present embodiments, there is provided a steer-by-wire type steering device for which it is possible to reduce components, e.g., pinion and support yoke, save costs by simplifying the shape and assembly process, reduce operation and reverse steering noise due to inter-gear friction, and driving friction, and enhance durability.

According to the present embodiments, there may be provided a steer-by-wire type steering device, comprising a sliding bar axially slid by a motor, a housing receiving the sliding bar, and a damper formed in an annular shape and including a first support coupled to an inner circumferential surface of the housing to be circumferentially supported and a second support coupled to the sliding bar to be circumferentially supported.

According to the present embodiments, it is possible to reduce components, e.g., pinion and support yoke, save costs by simplifying the shape and assembly process, reduce operation and reverse steering noise due to inter-gear friction, and driving friction, and enhance durability.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
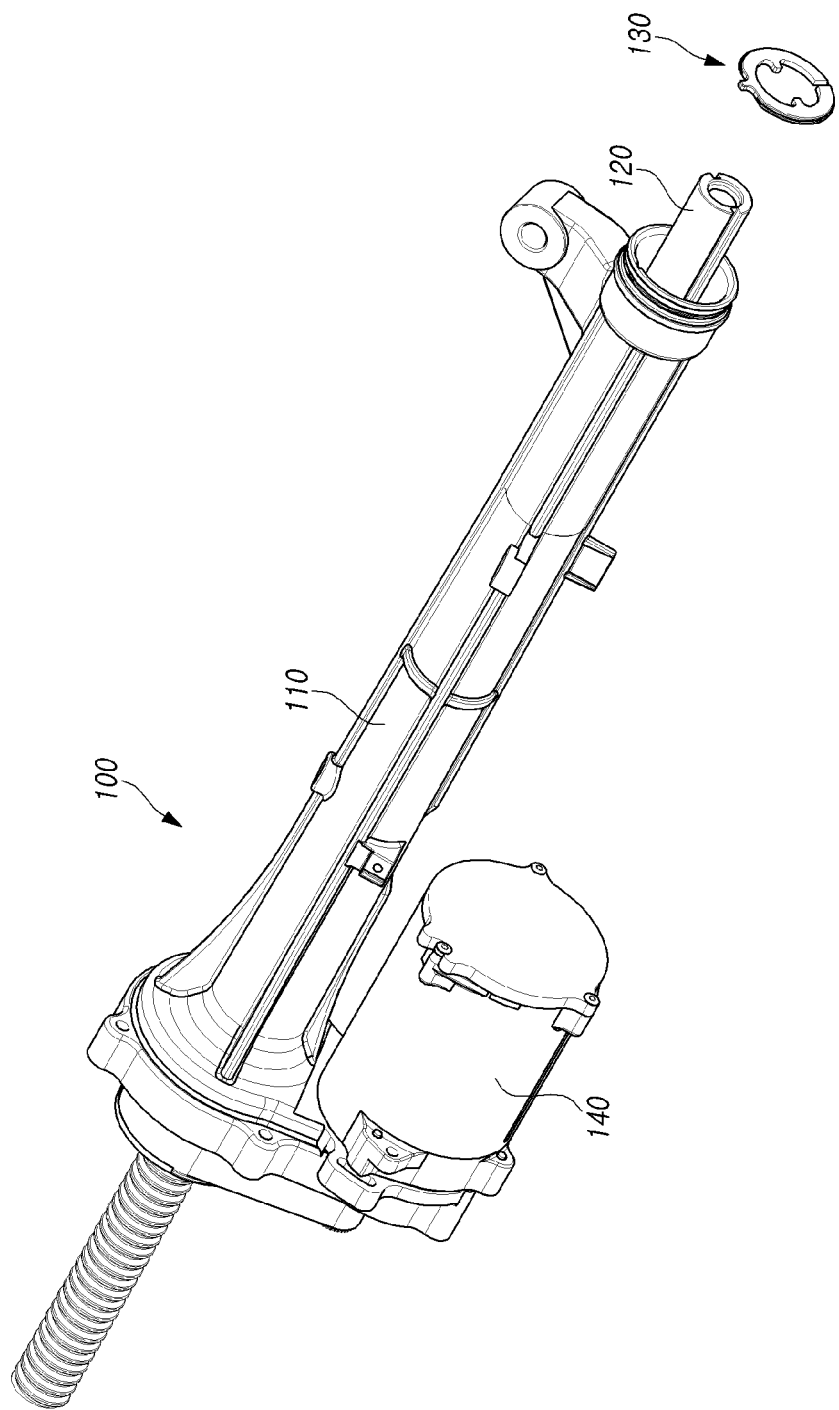
FIG. 1 is an exploded perspective view illustrating a steer-by-wire type steering device according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
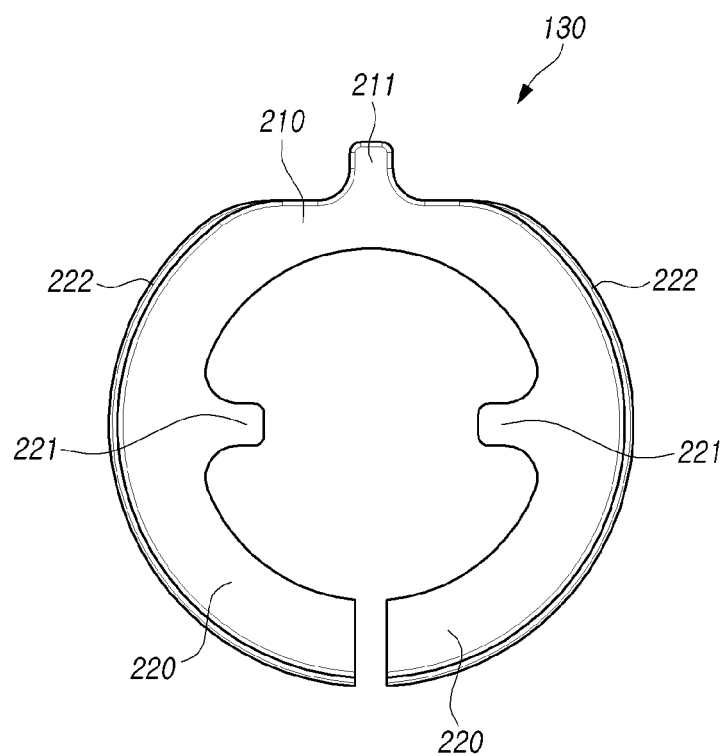
FIG. 2 is a front view illustrating a portion of FIG. 1.
Figure 3:
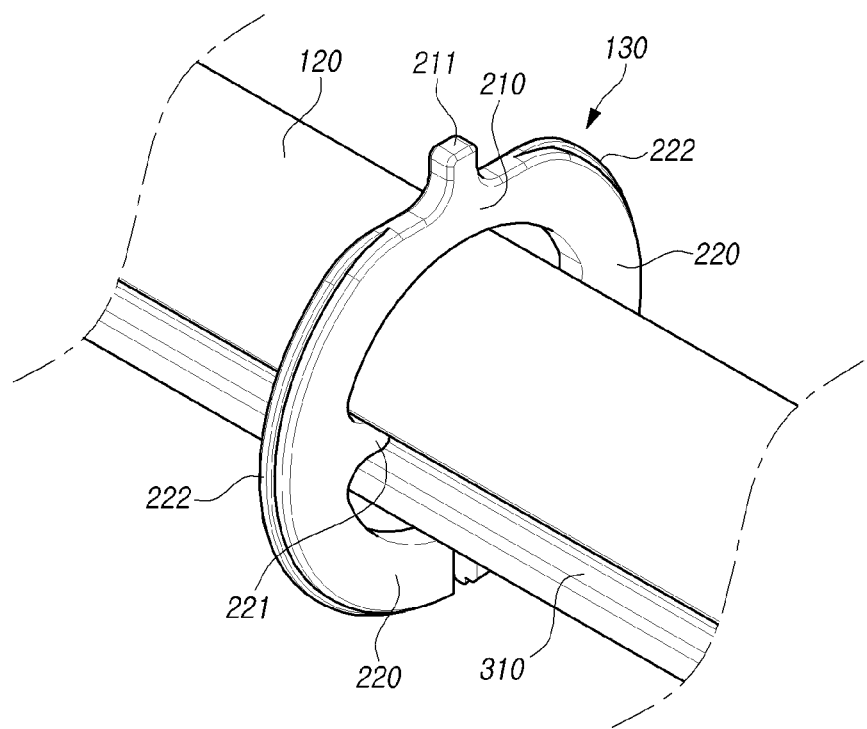
FIG. 3 is a perspective view illustrating an assembled state of a portion of FIG. 1.
Figure 4:
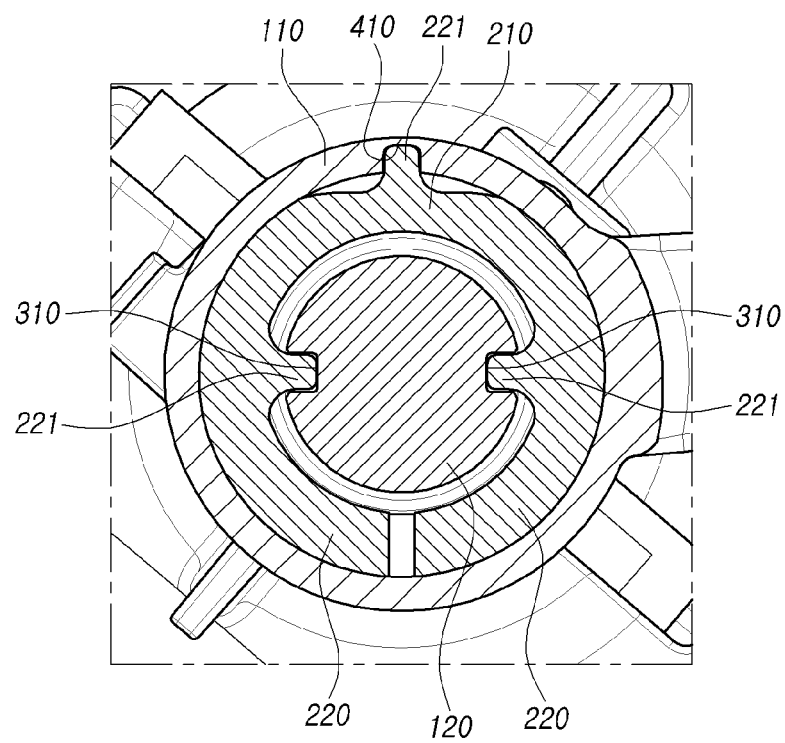
FIGS. 4, 5, and 6 are cross-sectional views illustrating an assembled state of FIG. 1.
Figure 5:
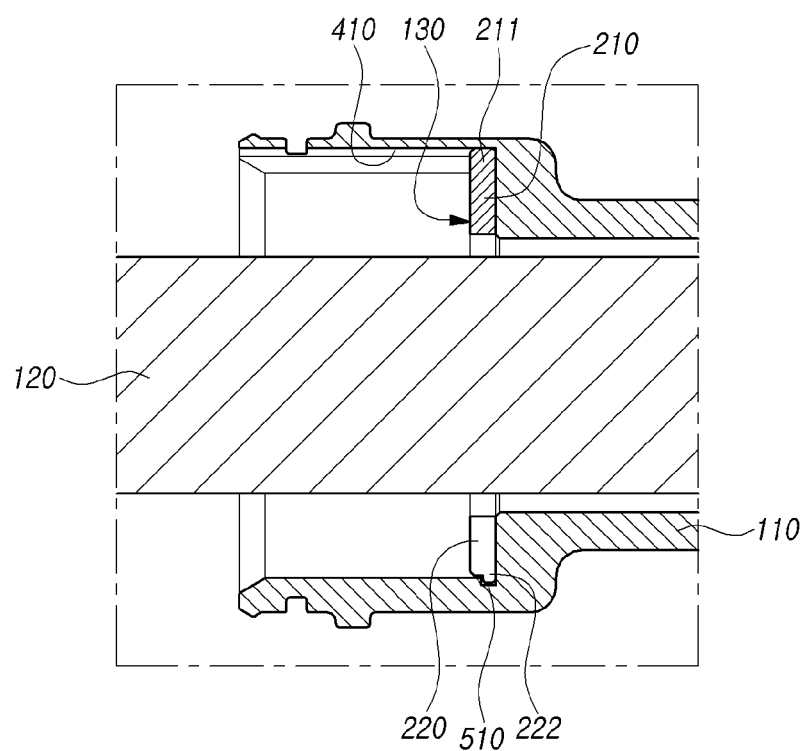
Figure 6:
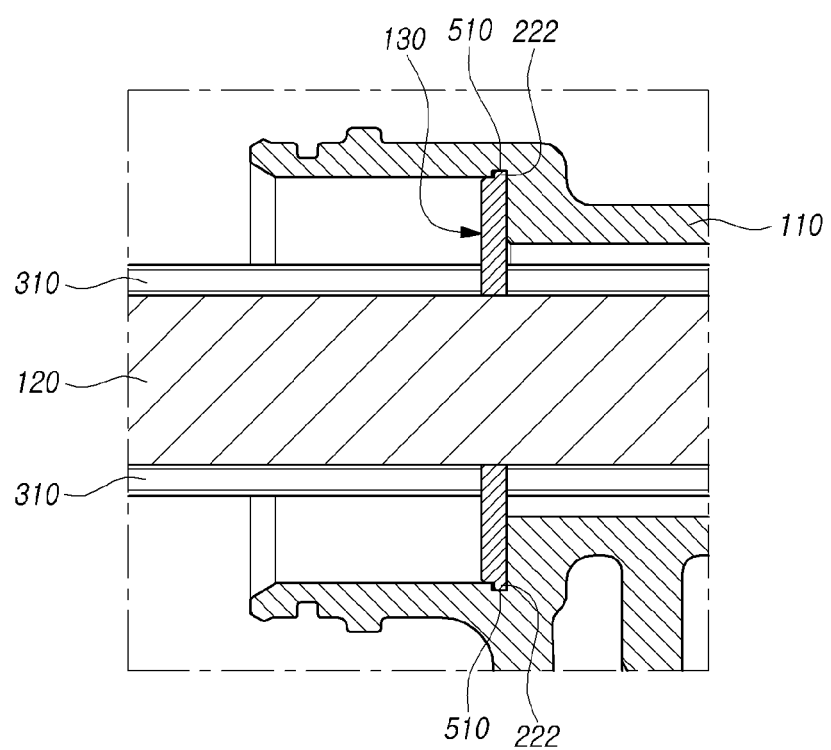

FIG. 1 is an exploded perspective view illustrating a steer-by-wire type steering device according to the present embodiments. FIG. 2 is a front view illustrating a portion of FIG. 1. FIG. 3 is a perspective view illustrating an assembled state of a portion of FIG. 1. FIGS. 4, 5, and 6 are cross-sectional views illustrating an assembled state of FIG. 1.

According to the present embodiments, a steer-by-wire type steering device 100 comprises a sliding bar 120 axially slid by a motor 140, a housing 110 receiving the sliding bar 120, and a damper 130 formed in an annular shape and including a first support 210 coupled to an inner circumferential surface of the housing 110 to be circumferentially supported and a second support 220 coupled to the sliding bar 120 to be circumferentially supported.

Referring to FIG. 1, referring to FIG. 1, the sliding bar 120 is provided to be axially slidable inside the housing 110. The sliding bar 120 is axially slid by the motor 140 coupled to the housing 110.

Knuckle arms (not shown) and tie rods connected with wheels (not shown) are connected to two opposite ends of the sliding bar 120, so that the wheels are steered as the sliding bar 120 is slid by the motor 140.

The motor 140 is controlled by an electronic control unit (not shown) provided in the vehicle. The electronic control unit receives steering information from a torque sensor, an angle sensor, a vehicle speed sensor, and a camera provided on a steering shaft (not shown) and controls the motor 140 based on the received steering information.

The torque of the motor 140 may be converted by, e.g., a pulley, a belt, and a ball nut and transferred to the sliding bar 120. The structure of the pulley, belt, and ball nut is known in the art, and is thus not described in detail.

In order for the sliding bar 120 to be axially slid by the rotation of the ball nut, the sliding bar 120 needs to be fixed without being rotated. Accordingly, in the steer-by-wire type steering device 100 according to the present embodiments, the damper 130 is provided to be circumferentially supported by the housing 110 and the sliding bar 120, so that the sliding bar 120 is not rotated but is axially slid by the torque of the motor 140.

The conventional steer-by-wire steering device, like a non-steer-by-wire, mechanical steering device, has a pinion shaft and prevents rotation of the rack bar by allowing the pinion shaft to engage with the rack gear to be circumferentially supported on the rack bar. In other words, the pinion shaft is not mechanically connected with the steering shaft but is coupled to the rack housing to rotate when the rack bar slides.

This is so done because of high compatibility between mechanical steering devices and the assembly and production line, but equipping a steer-by-wire steering device with a pinion shaft is disadvantages in terms of costs. Further, this approach may suffer from frictional noise between the rack gear and the pinion gear and banging noise upon reverse steering which causes uncomfortable steering.

Therefore, according to the present embodiments, it is possible to omit the support yoke for maintaining engagement between the rack gear and the pinion gear, bearing for supporting rotation of the pinion shaft, and pinion shaft assembly formed in the housing, as well as the pinion shaft, thus reducing the number of components. Further, the shape and assembly process may be simplified, thus leading to cost savings. It is also possible to reduce operation noise due to inter-gear friction and noise due to reverse steering.

However, in order for the pinion shaft to prevent rotation of the rack bar in the conventional steering device, according to the present embodiments, the damper 130 circumferentially fastens the sliding bar 120 to the housing 110.

Meanwhile, in the conventional steering device, the moving position of the rack bar is detected from the rotational angle of the pinion shaft. According to the present embodiments, since the pinion shaft is omitted, the moving position of the sliding bar 120 may be detected from the rotational angle of, e.g., the pulley, belt, and ball nut connecting the motor 140 and the sliding bar 120, or a linear sensor may be provided in the housing 110 to detect the moving position of the sliding bar 120.

In the conventional steering device, a noise damper is provided inside the rack housing to buffer collision of, e.g., an inner ball joint to the rack housing when the rack bar is positioned in the maximum displacement to one side or its opposite side. In general, the noise damper is not supported by the rack bar but is axially placed between the rack housing and the inner ball joint.

According to the present embodiments, the noise damper 130 includes a first support 210 coupled to the inner circumferential surface of the housing 110 to be circumferentially supported and a second support 220 coupled to the sliding bar 120 to be circumferentially supported, and rotation of the sliding bar 120 is prevented by the noise damper 130.

Referring to FIGS. 2 to 4, the noise damper 130 is formed in an annular shape. The outer circumferential surface of the noise damper 130 is supported on the inner circumferential surface of the housing 110, and the inner diameter thereof is formed to be larger than the outer diameter of the sliding bar 120 so that the inner circumferential surface of the noise damper 130 may be spaced apart from the sliding bar 120.

A pair of second supports 220 may be provided to face each other, with the sliding bar 120 interposed therebetween, so that the noise damper 130 may be supported symmetrically with respect to the sliding bar 120 to distribute the load applied to each second support 220 by the torque of the motor 140. Thus, the durability of the noise damper 130 is enhanced.

The first support 210 may be provided to connect the respective first ends (upper ends in the drawings) of the second supports 220. The respective second ends (lower ends in the drawings) of the pair of second supports 220 may be circumferentially spaced apart from each other.

The noise damper 130 may be coupled to the inner circumferential surface of the housing 110 before the sliding bar 120 is provided in the housing 110. The noise damper 130 may be inserted into the inside of the housing 110 while the diameter of the noise damper 130 is shrunken so that the interval between the second ends of the second supports 220 narrows, and then, the interval between the second ends widens so that a step portion 222 is inserted into a seating groove 510.

A first protrusion 211 may protrude from the outer surface of the first support 210. A first sliding groove 410 may be formed in the inner circumferential surface of the housing 110 to allow the first protrusion 211 to be inserted thereto. The noise damper 130 may be circumferentially fastened while the first protrusion 211 is circumferentially supported on the housing 110 in the first sliding groove 410.

The load applied to the noise damper 130 by the torque of the motor 140 is supported and distributed by the friction between the outer surface of the second support 220 and the housing 110 as well as the first protrusion 211, so that the durability of the noise damper 130 is enhanced.

The first sliding groove 410 is formed to be axially open and axially long up to the seating groove 510 (refer to FIG. 5).

Accordingly, the first protrusion 211 is inserted into the open end of the first sliding groove 410, and the noise damper 130 is inserted into the inside of the housing 110 and slides along the first sliding groove 410 so that the noise damper 130 may be coupled to the housing 110. Thus, assemblability is enhanced.

As described above, a step portion 222 protrudes from the outer surface of the second support 220, and the seating groove 510 is formed in the inner circumferential surface of the housing 110 to allow the step portion 222 to be inserted thereto.

The step portion 222 may be formed long along the circumferential surface on the outer surface of the second support 220. As the step portion 222 is inserted to the seating groove 510, the noise damper 130 is axially fixed to the housing 110.

One side surface of the noise damper 130 axially fixed to the housing 110 faces the open side of the housing 110, so that collision between the housing and, e.g., the inner ball joint, is buffered.

Second protrusions 221 may protrude from the inner surfaces of the second supports 220. Second sliding grooves 310 may be formed in the outer circumferential surface of the sliding bar 120 to allow the second protrusions 221 to be inserted thereto. The sliding bar 120 may be circumferentially fastened while the second protrusions 221 are circumferentially supported on the sliding bar 120 in the second sliding grooves 310.

The second sliding grooves 310 may be formed to be axially long to be slid while being coupled with the noise damper 130. Further, the second sliding grooves 310 may be formed to be axially open to allow the sliding bar 120 and the noise damper 130 to be smoothly assembled (refer to FIG. 1).

In other words, the noise damper 130 may not only prevent the sliding bar 120 from rotating but also support the sliding of the sliding bar 120 by the second protrusions 221 and the second sliding grooves 310.

To reduce friction produced between the second protrusions 221 and the second sliding grooves 310 as the sliding bar 120 is axially slid and the noise damper 130 is axially fixed, the second sliding grooves 310 may be coated with grease.

The noise damper 130 may be formed of an elastic material, such as rubber, e.g., natural rubber (NR), styrene butadiene rubber (SBR), nitrile butadiene rubber (NBR), or ethylene propylene terpolymers (EPDM), or polyester elastomer (PE). Similarly, to reduce friction generated between the second protrusions 221 and the second sliding grooves 310, the second protrusions 221 may be plated with the same metal as the sliding bar 120.

For example, if the sliding bar 120 is formed of steel, the second protrusions 221 may be plated with iron and, as the sliding between the noise damper 130 and the sliding bar 120 is made between the same materials, friction may be relatively reduced.

In other words, by applying grease to the second sliding grooves 310 or plating the second protrusions 221, friction is reduced when the sliding bar 120 slides, and the durability of the noise damper 130 is enhanced.

By the so-shaped steer-by-wire type steering device, it is possible to reduce components, e.g., pinion and support yoke, save costs by simplifying the shape and assembly process, reduce operation and reverse steering noise due to inter-gear friction, and driving friction, and enhance durability.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steer-by-wire steering device, comprising:
a sliding bar axially slid by a motor;
a housing receiving the sliding bar; and
a damper formed in an annular shape and including a first support coupled to an inner circumferential surface of the housing to be circumferentially supported and a second support coupled to the sliding bar to be circumferentially supported,
wherein a first protrusion protrudes from an outer surface of the first support, and wherein a first sliding groove is formed in the inner circumferential surface of the housing to allow the first protrusion to be inserted thereto.

2. The steer-by-wire steering device of claim 1, wherein a pair of second supports are provided to face each other, with the sliding bar interposed therebetween.

3. The steer-by-wire steering device of claim 2, wherein the first support is provided to connect respective first ends of the pair of second supports.

4. The steer-by-wire steering device of claim 3, wherein respective second ends of the pair of second supports are circumferentially spaced apart from each other.

5. The steer-by-wire steering device of claim 1, wherein the first sliding groove is formed to be axially open.

6. The steer-by-wire steering device of claim 1, wherein a step portion protrudes from an outer surface of the second support, and wherein a seating groove is formed in the inner circumferential surface of the housing to allow the step portion to be inserted thereto.

7. The steer-by-wire steering device of claim 1, wherein a second protrusion protrudes from an inner surface of the second support, and wherein a second sliding groove is formed in an outer circumferential surface of the sliding bar to allow the second protrusion to be inserted thereto.

8. The steer-by-wire steering device of claim 7, wherein the second sliding groove is formed to be axially open.

9. The steer-by-wire steering device of claim 7, wherein grease is applied to the second sliding groove.

10. The steer-by-wire steering device of claim 7, wherein the second protrusion is plated with the same metal as the sliding bar.

\* \* \* \* \*